United States Patent
Moskowitz et al.

(10) Patent No.: US 11,119,314 B1
(45) Date of Patent: Sep. 14, 2021

(54) APPARATUS AND METHOD FOR MITIGATING MOTION SICKNESS THROUGH CYCLICAL OBJECT PROJECTION IN DIGITAL SPACE

(71) Applicant: Synapcis Inc., Los Angeles, CA (US)

(72) Inventors: Michael H. Moskowitz, Los Angeles, CA (US); Glen West, Los Angeles, CA (US); Timothy McCann, Los Angeles, CA (US)

(73) Assignee: Synapcis Inc., Los Angeles, CA (US)

( * ) Notice: Subject to any disclaimer, the term of this patent is extended or adjusted under 35 U.S.C. 154(b) by 0 days.

(21) Appl. No.: 17/196,829

(22) Filed: Mar. 9, 2021

Related U.S. Application Data

(60) Provisional application No. 63/053,279, filed on Jul. 17, 2020.

(51) Int. Cl.
| | | |
|---|---|---|
| *G02B 27/00* | (2006.01) | |
| *G06F 3/01* | (2006.01) | |
| *A63F 13/214* | (2014.01) | |
| *G02B 27/01* | (2006.01) | |

(52) U.S. Cl.
CPC ........ *G02B 27/0093* (2013.01); *A63F 13/214* (2014.09); *G02B 27/017* (2013.01); *G06F 3/012* (2013.01); *G06F 3/013* (2013.01)

(58) Field of Classification Search
USPC ........................................................ 345/156
See application file for complete search history.

(56) References Cited

U.S. PATENT DOCUMENTS

| | | |
|---|---|---|
| 6,497,649 B2 | 12/2002 | Parker et al. |
| 6,692,428 B1 | 2/2004 | Kania |
| 7,717,841 B2 | 5/2010 | Brendley et al. |
| 7,722,526 B2 | 5/2010 | Kim |
| 8,690,750 B2 | 4/2014 | Krueger |
| 9,153,009 B2 | 10/2015 | Kim |
| 10,580,386 B2 | 3/2020 | Gusikhin et al. |
| 10,589,679 B1 | 3/2020 | Askeland |
| 10,621,698 B2 | 4/2020 | Rikoski |

(Continued)

OTHER PUBLICATIONS

Bloch, M. (2018). Alleviating motion sickness through presentations on interior panels of autonomous vehicles, Master Thesis, 44 total pages.

(Continued)

*Primary Examiner* — Chineyere D Wills-Burns
(74) *Attorney, Agent, or Firm* — Cooley

(57) ABSTRACT

A method includes projecting an object in a digital space. The object is transitioned to a final viewable peripheral location in the digital space. The object is removed from the digital space to define an unviewable path segment. The object is introduced to an initial viewable peripheral location in the digital space substantially opposite the final viewable peripheral location in the digital space. The initial viewable peripheral location to the final viewable peripheral location defines a viewable path segment. The object is returned to the center of the digital space. The operations are performed in an aggregate object path including the viewable path segment and the unviewable path segment. The object has a pre-configured object velocity and a pre-configured cycle time period in the aggregate object path.

20 Claims, 3 Drawing Sheets

(56) References Cited

U.S. PATENT DOCUMENTS

| | | | | |
|---|---|---|---|---|
| 2012/0050143 | A1* | 3/2012 | Border | G09G 3/3611 |
| | | | | 345/8 |
| 2016/0026253 | A1* | 1/2016 | Bradski | H04N 13/344 |
| | | | | 345/8 |
| 2018/0089901 | A1* | 3/2018 | Rober | G06T 19/006 |
| 2018/0365804 | A1* | 12/2018 | Rikoski | G09G 5/003 |
| 2019/0047498 | A1* | 2/2019 | Alcaidinho | G06F 3/14 |
| 2019/0269321 | A1* | 9/2019 | Murakami | G01M 17/00 |
| 2019/0320125 | A1 | 10/2019 | Goldstein | |
| 2019/0354173 | A1* | 11/2019 | Young | G06F 3/015 |
| 2020/0166742 | A1 | 5/2020 | Peyman | |
| 2020/0365117 | A1* | 11/2020 | Dumas | G06F 3/011 |
| 2021/0125417 | A1* | 4/2021 | Ando | G06F 3/011 |

OTHER PUBLICATIONS

Boarding Glasses (2020). FAQ, 17 total pages.

Carter, L. (2018). "Observations and opportunities for deploying virtual reality for passenger boats," 6 total pages.

Fernandes, A.S. et al. (2016). "Combating VR sickness through subtle dynamic field-of-view modification," IEEE Symposium on 3D User Interfaces 2016, pp. 201-210.

Hock, P. et al. (2017). "CarVR: Enabling in-car virtual reality entertainment," 11 total pages.

Krueger, W. et al. (2017). "Method to mitigate Nystagmus and motion sickness with head worn visual display during vestibular stimulation," J. Otolaryngol Ent Res. 7(5):00216.

McGill, M. et al. (2017). "I am the passenger: How visual motion cues can influence sickness for in-car VR," CHI '17: Proceedings of the 2017 CHI Conference on Human Factors in Computing Systems, pp. 5655-5668.

Moskvitch, K. (2015). "The search for an effective cure for motion sickness," 7 total pages.

Nie, G.-Y. et al. (2020). "Analysis on mitigation of visually induced motion sickness by applying dynamical blurring on a user's retina," IEEE Transactions on Visualization and Computer Graphics 26:2535-2545.

Nimnual, R. et al. (2019). "Therapeutic virtual reality for Nyctophobic disorder," pp. 11-15.

Paredes, P.E. et al. (2018). "Driving with the fishes: Towards calming and mindful virtual reality experiences for the car," Proc. ACM Interact. Mob. Wearable Ubiquitous Technol., vol. 2, No. 4, Article 184, 21 total pages.

Phys Org (2016). "Startup commercializing virtual reality sickness solutions, helps move virtual reality mainstream," 3 total pages.

Schatzschneider, C. et al. (2015). "Who turned the clock? Effects of manipulated zeitgebers, cognitive load and immersion on time estimation," IEEE, 9 total pages.

Steinke, Q. et al. (2018). "VR evaluation of motion sickness solution in automated driving," Springer Nature, pp. 112-125.

Stevens, A.H. et al. (2019). "Reducing seasickness in onboard marine VR use through visual compensation of vessel motion," IEEE Conference on Virtual Reality and 3D User Interfaces, pp. 1872-1873.

Tal, D. et al. (2014). "Mal de debarquement, motion sickness and the effect of an artificial horizon," J. of Vestibular Res. 24:17-23.

Tucker, P. (2018). "This inventor may have cured motion sickness without drugs. And that could mean a lot to the US military," 5 total pages.

Zeng, A.D. (2019). "New motion sickness glasses launched," Knobbe Martens, 4 total pages.

* cited by examiner

APPARATUS AND METHOD FOR MITIGATING MOTION SICKNESS THROUGH CYCLICAL OBJECT PROJECTION IN DIGITAL SPACE

CROSS-REFERENCE TO RELATED APPLICATION

This application claims priority to U.S. Provisional Patent Application Ser. No. 63/053,279, filed Jul. 17, 2020, the contents of which are incorporated herein by reference.

FIELD OF THE INVENTION

This invention relates generally to alleviating motion sickness. More particularly, this invention is directed toward techniques for cyclical object projection in digital space to mitigate motion sickness.

BACKGROUND OF THE INVENTION

Sensory motor conflict produces motion sickness. Sensory motor conflict may arise in a number of circumstances, such as a conflict between an individual's expectation and actual sensory input. Sensory motor conflict may also be attributed to a conflict between motor input and sensory input. Sensory motor conflict may also arise through suppression of vestibulo-ocular reflexes. Symptoms of motion sickness include one or more of nausea, vomiting, salivation, fatigue, drowsiness, insomnia, pallor, listlessness, weakness, diarrhea, pain, headache, cognitive impairment, task decrements, anxiety, boredom, apathy and lack of motivation.

Thus, there is a need address the problem of motion sickness.

SUMMARY OF THE INVENTION

A method includes projecting an object in a digital space. The object is transitioned to a final viewable peripheral location in the digital space. The object is removed from the digital space to define an unviewable path segment. The object is introduced to an initial viewable peripheral location in the digital space substantially opposite the final viewable peripheral location in the digital space. The initial viewable peripheral location to the final viewable peripheral location defines a viewable path segment. The object is returned to the center of the digital space. The operations are performed in an aggregate object path including the viewable path segment and the unviewable path segment. The object has a pre-configured object velocity and a pre-configured cycle time period in the aggregate object path.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
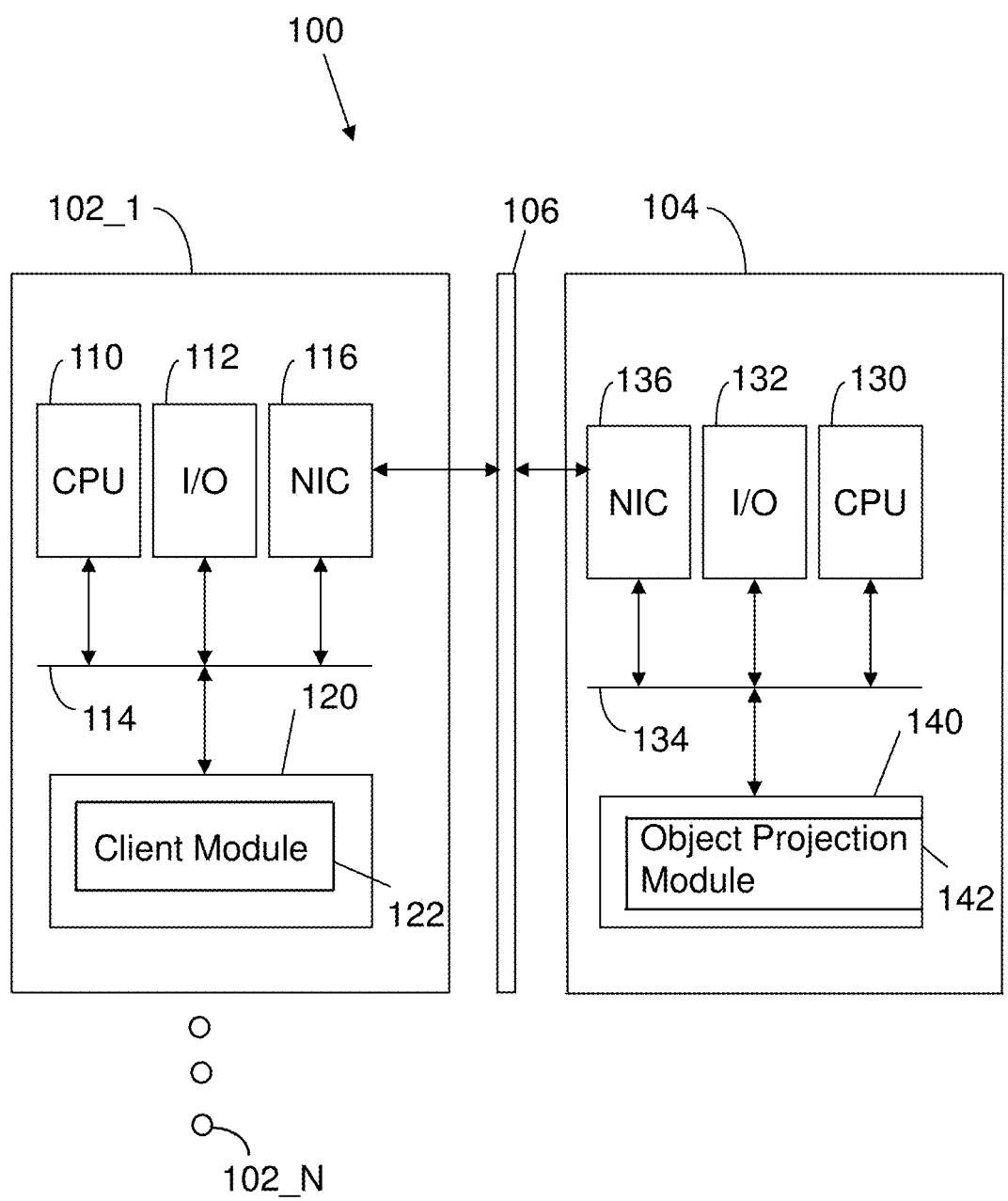
FIG. 1 illustrates a system configured in accordance with an embodiment of the invention.

FIG. 1 illustrates a system 100 configured in accordance with an embodiment of the invention. The system 100 includes a set of client devices 102_1 through 102_N in communication with a server 104 via a network 106, which may be any combination of wired and wireless networks. The client devices 102_1 through 102_N may be computers, tablets, mobile devices, game consoles, game controllers, head-mounted devices and the like. By way of example, client device 102_1 includes a processor 110 (e.g., a central processing unit) in communication with input/output devices 112 via a bus 114. The input/output devices 112 may include input devices, such as a keyboard, mouse, touch display and the like. The output devices include at least one display, which may be circular. The output devices may include multiple display devices. The output devices may be head-mounted devices. A network interface circuit 116 is also connected to bus 114 to provide connectivity to network 106. A memory 120 is also connected to the bus 114. The memory 120 stores a client module 122 with instructions executed by processor 110 to access server 104 to obtain digital content of the type disclosed herein. The digital content is displayed to a user on one or more output devices.

Server 104 includes a processor 130, input/output devices 132, bus 134 and network interface circuit 136. A memory 140 is connected to bus 134. The memory 140 stores an object projection module 142 with instructions executed by processor 130 to implement operations disclosed herein. The object projection module 142 may be installed on any one of client devices 102_1 through 102_N. The invention is disclosed in the context of a client-server environment by way of example, not by way of limitation.

Figure 2:
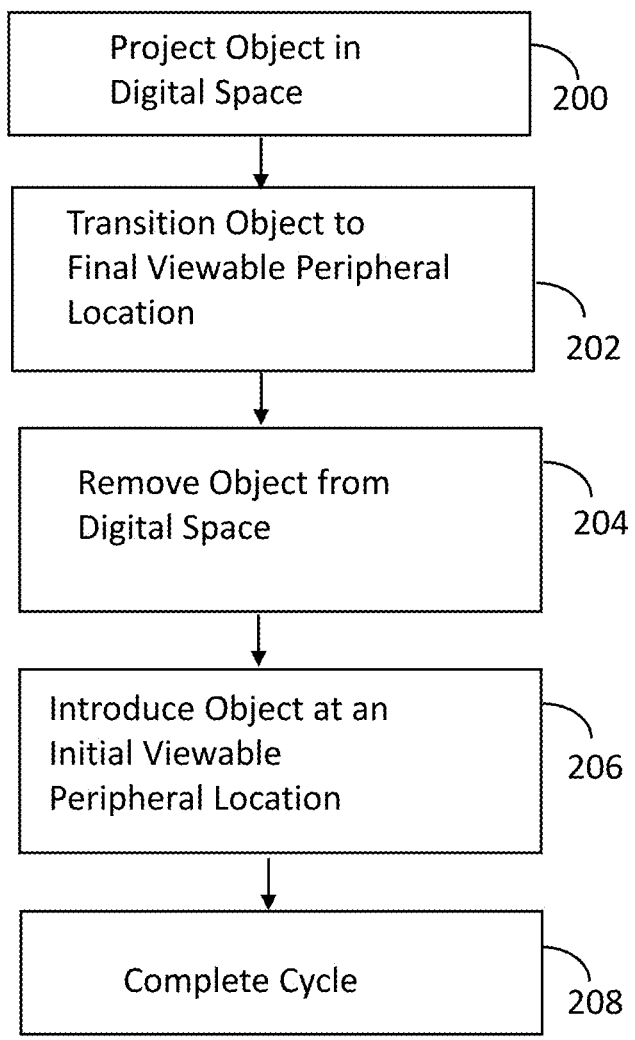
FIG. 2 illustrates processing operations associated with an embodiment of the invention.
Figure 3:
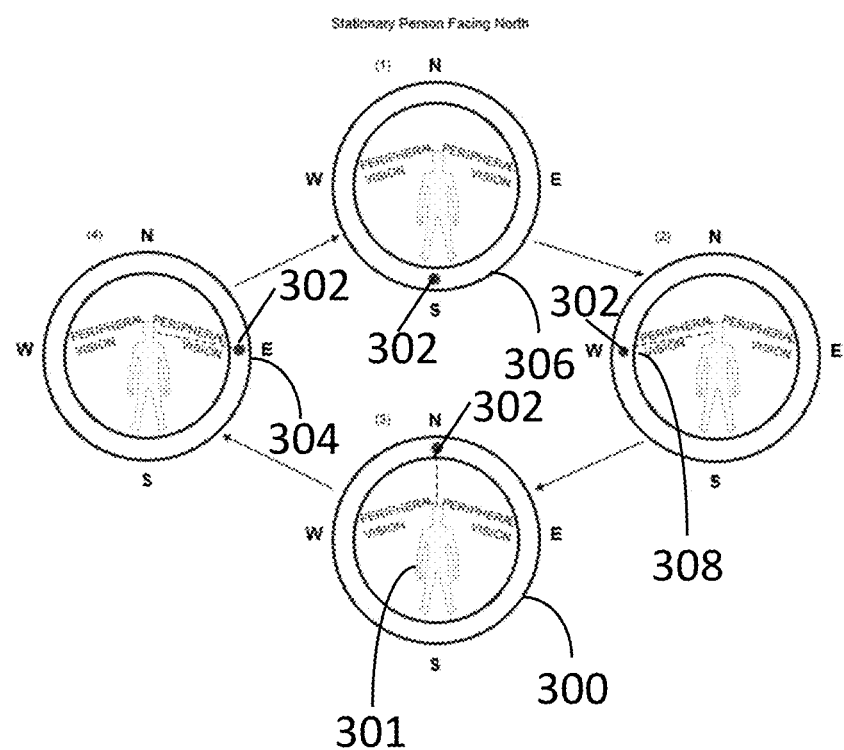
FIG. 3 illustrates cyclical object projection in digital space in accordance with an embodiment of the invention.

FIG. 2 illustrates operations implemented by the object projection module 142. An object is projected in digital space 200. FIG. 3 illustrates an initial state 300 where a subject 301 is exposed to a digital object 302. The projected object may be on a display, a set of displays, a circular display, the walls of an enclosed space, a head-mounted device and the like.

The next operation of FIG. 2 is to transition the object to a final viewable peripheral location 202. In the example of FIG. 3, the object 302 is moved clockwise to a final viewable peripheral location 304.

The next operation of FIG. 2 is to remove the object from digital space 204. FIG. 3 shows a state 306 in which the object 302 is essentially behind the subject and therefore not viewable. This area is referred to as an unviewable path segment.

The next operation of FIG. 2 is to introduce the object at an initial viewable peripheral location 206. FIG. 3 shows an initial viewable peripheral location 308 reached after the object continues to move clockwise. The initial viewable peripheral location 308 in the digital space is substantially opposite the final viewable peripheral location 304 in the digital space. The initial viewable peripheral location to the final viewable peripheral location define a viewable path segment. Thus, an aggregate object path includes the viewable path segment and the unviewable path segment.

The final operation of FIG. 2 is to complete the cycle 208. That is, the object 302 moves clockwise to the initial position shown in state 300 of FIG. 3. The object has a pre-configured object velocity and a pre-configured cycle time period in the aggregate object path. In one embodiment, the object moves between 1 and 36 revolutions per minute. Clockwise and counterclockwise motion may be used.

In addition to the disclosed object projection operations, embodiments of the invention may include prompting user interaction to initiate disruption of the object in the viewable path segment. The prompts may be projected to the user and the user may respond by applying a gesture to a computer, touch display, game controller, and the like. In one embodiment, the user responds by eye motions analyzed through a head-mounted eye tracking device.

The disruption of the object alters at least one of object velocity, object distance and object direction. The disruption of the object is initiated by pointing at the object, gesturing at the object, aiming at the object, shooting at the object or throwing at the object. In one embodiment, the disruption of the object is initiated with a game controller. The game controller may be hand operated or foot operated.

An embodiment of the invention also includes presenting sound to the user. The sound is in the range of 0.1 Hz to 20 kHz throughout the aggregate object path. Preferably, the sound is in the range of 0.1 Hz to 100 Hz throughout the aggregate object path.

The aggregate object path is an orbital path. In one embodiment, the orbital path is circular. In another embodiment, the orbital path is elliptical. In one embodiment, the object in the viewable path segment is continuously projected. In another embodiment, the object in the viewable path segment is intermittently projected. In one embodiment, the digital space is two-dimensional. In another embodiment, the digital space is three-dimensional.

Returning to FIG. 3, the subject 301 may be standing, seated or laying down. A rotating two or three-dimensional environment is projected. The environment may be patterned and/or textured, in which a singular object or plurality of objects further rotate(s) in front of, above or below the user's line of sight. The user interacts with the object(s) by tracking/following the object(s) with their vision or by pointing and/or gesturing, aiming, shooting, throwing, glancing at the object(s). As the user continues to interact with the rotating object(s) in the viewable path, the user continues to track/follow the object with their vision or by pointing and/or gesturing, aiming, shooting, throwing, glancing at the object(s). As the object(s) rotate(s) out of the user's peripheral vision, the oculo-cervical rotation and engagement with an endpoint coordinate oculomotor, vestibuloacoustic and voluntary motor movement functions.

Different methods of directing user attention or engagement and activity can also be applied, whether dynamically or not, by varying the direction and speed of the rotation, the point of engagement and the method of engagement. User engagement activities can include throwing, shooting, pointing, gesturing and glancing, and user instruction can be varied (e.g. "look ahead and shoot the ball," and "follow the bird and throw the fishing line.").

The invention can be accessed through a variety of software or hardware devices and be augmented by a range of observations through the application of machine learning and artificial intelligence, as well as neural interfacing and processing tools. However, given that it can be used for many other purposes that will still reduce motion sickness, use of the invention is not confined to virtual reality and/or augmented reality and/or mixed reality devices.

There is provided a function on a display unit or as projected onto or through a fixed or floating surface which functions as a display unit, a singular object or plurality of objects rotating in two or three-dimensional space. The object(s) coordinate(s) the oculomotor, vestibuloacoustic and voluntary motor movement functions of a user so as to prevent or alleviate the effects of motion sickness.

The process of establishing motion stability in the user is independent of environment setting and requires that the user participate in an activity in an environment which they view in the form of a digital representation, which in one embodiment is referred to as a halo digital representation. The digital representation may be projected in a room or field at a fixed perspective relative to the user. The digital representation has a variable graphical appearance which triggers the user's cognitive recognition of patterns. The radius, speed of rotation, and rotational direction of the halo may be varied, whether by the user or dynamically. As part of the abovementioned activity, the user tracks and engages with an object which has a movement endpoint using oculo-cervical rotation. The invention has therefore been designed to promote various methods of interaction which may include pointing and/or gesturing, aiming, shooting, throwing, glancing at the object(s).

The halo can be displayed in a standalone environment or, where embedded, can dynamically interact with the flow of an environment, such as in a game program or the real world. The user can voluntarily summon the halo or be prompted to do so if a computer program determines that the user needs to (re)establish motion stability, whether as according to a predetermined condition or a condition generated by the computer or program itself. The methods of activity the user performs in coordination with the halo and/or the environment can be varied.

A substantiation of the invention is its display to the user when a portable head-mounted electronic device or apparatus is worn on the user's head, such as a virtual reality or augmented reality or mixed reality head-mounted device, or other such device or apparatus, which may or may not retain a portable electronic device as a method of operation and communication but which otherwise acts as a method of display to the user.

A further substantiation of the invention is its representation not only on a singular display surface but also across multiple display surfaces such as a computer, portable display screen, folding device with or without flexible display screen, mobile phone, watch, seatback or wall-mounted display, augmented reality head-up display, digital mirror device, or holographic display. Irrespective as to the invention's proximity from the user, the user may hold, place or situate in front of themselves a singular display or multiple displays while looking at and interacting with the invention, whether by capacitive touch, eye tracking or any other method of interaction determined by the user and/or software and/or device, which either partially or in its entirety can span multiple screens and/or devices and is platform agnostic.

A further substantiation of the invention is its representation in an aircraft and/or motor vehicle and/or train and/or tram and/or boat, not only on a singular display surface but also across multiple display surfaces such as a computer, portable display screen, seatback or wall-mounted display, augmented reality head-up display, digital mirror device or holographic display.

As vestibuloacoustic sound may be considered a supplementary component of the invention, sound generated from the brain's own waveforms, in the range of 1-20 kHz, may be used to augment the user's experience and the effects of the invention upon them. Whether related to an environment, rotation or user interaction, one or more waveform(s) may extend the period of time during which a user of the invention experiences motion stability.

The invention is designed to prevent or alleviate the effects of motion sickness in a standard gravity environment through active engagement in the experience. The invention is portable and both platform and display agnostic, being such that it can be displayed in any form of display screen or projection, a vehicle windscreen, mirror or head-up display of an aircraft and/or motor vehicle and/or train and/or tram and/or boat, or in a virtual reality, augmented reality or mixed reality device.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method, comprising:
    projecting an object in a digital space;
    transitioning the object to a final viewable peripheral location in the digital space;
    removing the object from the digital space to define an unviewable path segment;
    introducing the object to an initial viewable peripheral location in the digital space substantially opposite the final viewable peripheral location in the digital space, the initial viewable peripheral location to the final viewable peripheral location defining a viewable path segment; and
    returning the object to the center of the digital space, wherein the projecting, transitioning, removing, introducing and returning are performed in an aggregate object path including the viewable path segment and the unviewable path segment, wherein the object has a pre-configured object velocity and a pre-configured cycle time period in the aggregate object path.

2. The method of claim 1 further comprising prompting user interaction to initiate disruption of the object in the viewable path segment.

3. The method of claim 2 wherein the disruption of the object alters at least one of object velocity, object distance and object direction.

4. The method of claim 2 wherein the disruption of the object is initiated by pointing at the object, gesturing at the object, aiming at the object, shooting at the object or throwing at the object.

5. The method of claim 2 wherein the disruption of the object is initiated with a game controller.

6. The method of claim 5 wherein the game controller is hand operated.

7. The method of claim 5 wherein the game controller is foot operated.

8. The method of claim 2 wherein the disruption of the object is initiated through eye tracking.

9. The method of claim 1 further comprising presenting sound in the range of 0.1 Hz to 20 kHz throughout the aggregate object path.

10. The method of claim 9 comprising presenting sound in the range of 0.1 Hz to 100 Hz throughout the aggregate object path.

11. The method of claim 1 wherein the aggregate object path is an orbital path.

12. The method of claim 11 wherein the orbital path is circular.

13. The method of claim 11 wherein the orbital path is elliptical.

14. The method of claim 1 wherein the object in the viewable path segment is continuously projected.

15. The method of claim 1 wherein the object in the viewable path segment is intermittently projected.

16. The method of claim 1 implemented on a head-mounted device.

17. The method of claim 1 implemented on multiple display devices.

18. The method of claim 1 implemented on a circular display device.

19. The method of claim 1 wherein the digital space is two-dimensional.

20. The method of claim 1 wherein the digital space is three-dimensional.

* * * * *